United States Patent
Saje et al.

(10) Patent No.: US 10,352,346 B2
(45) Date of Patent: Jul. 16, 2019

(54) INTEGRATED AMALGAMATION CARRIER

(71) Applicant: GM GLOBAL TECHNOLOGY OPERATIONS LLC, Detroit, MI (US)

(72) Inventors: Robert N. Saje, Shelby Township, MI (US); Bhavesh Shah, Troy, MI (US); Matthew P. Simonin, Ortonville, MI (US); Kevin Stang, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 319 days.

(21) Appl. No.: 15/235,621

(22) Filed: Aug. 12, 2016

(65) Prior Publication Data
US 2018/0045236 A1    Feb. 15, 2018

(51) Int. Cl.
*F16B 15/00*  (2006.01)
*F16B 5/04*   (2006.01)
*F16B 15/06*  (2006.01)
*F16B 19/08*  (2006.01)

(52) U.S. Cl.
CPC ............ *F16B 15/0023* (2013.01); *F16B 5/04* (2013.01); *F16B 15/0046* (2013.01); *F16B 15/06* (2013.01); *F16B 19/086* (2013.01); *F16B 2015/0076* (2013.01)

(58) Field of Classification Search
CPC .............. F16B 15/0023; F16B 15/0003; F16B 15/0038; F16B 15/0046; F16B 19/0086; F16B 2015/0069; F16B 2015/0076; E04B 1/49; B29C 65/564; B32B 3/30
See application file for complete search history.

(56) References Cited

U.S. PATENT DOCUMENTS

| | | | |
|---|---|---|---|
| 3,172,171 A * | 3/1965 | Knight | E04B 1/49 411/458 |
| 3,605,360 A * | 9/1971 | Lindal | B27H 1/00 52/223.8 |
| 4,157,676 A * | 6/1979 | Jureit | E04B 1/49 411/458 |
| 5,006,006 A * | 4/1991 | Lehtonen | E04B 1/49 403/272 |
| 5,048,256 A * | 9/1991 | Thorsnes | E04C 3/292 52/847 |
| 5,466,317 A * | 11/1995 | Lause | B29C 37/0082 156/244.11 |
| 5,966,892 A * | 10/1999 | Platt | E04B 1/26 403/386 |
| 9,234,350 B1 * | 1/2016 | Gilbert | E04C 3/36 |
| 9,259,899 B1 * | 2/2016 | Arbesman | B32B 7/08 |

(Continued)

FOREIGN PATENT DOCUMENTS

| | | | | |
|---|---|---|---|---|
| CA | 2273992 A1 * | 7/1998 | | B29C 65/564 |
| CH | 255340 A * | 6/1948 | | E04B 1/49 |

(Continued)

*Primary Examiner* — Jacob J Cigna
(74) *Attorney, Agent, or Firm* — Quinn IP Law

(57) ABSTRACT

An integrated amalgamation carrier can join parts. The integrated amalgamation carrier includes an amalgamation carrier body elongated along a longitudinal axis. In addition, the integrated amalgamation carrier includes a plurality of fasteners protruding from the amalgamation carrier body. The fasteners are integrated with the amalgamation body to form a one-piece structure.

2 Claims, 6 Drawing Sheets

(56) References Cited

U.S. PATENT DOCUMENTS

| | | | | |
|---|---|---|---|---|
| 2016/0101612 A1* | 4/2016 | Arbesman | ................ | B32B 3/30 |
| | | | | 156/196 |
| 2016/0230797 A1* | 8/2016 | Arbesman | ........... | F16B 15/0046 |

FOREIGN PATENT DOCUMENTS

| | | | | | |
|---|---|---|---|---|---|
| CN | 105864267 | A | | 8/2016 | |
| DE | 835527 | C | * | 4/1952 | ............... E04B 1/49 |
| DE | 1225366 | B | * | 9/1966 | ............... E04B 1/49 |
| DE | 2613522 | A1 | * | 10/1977 | .......... F16B 15/0046 |
| DE | 29713036 | U1 | * | 9/1997 | ............... E04B 1/49 |
| DE | 102009047671 | A1 | * | 6/2011 | ........... B29C 65/344 |
| DE | 102015001635 | A1 | * | 8/2016 | .......... F16B 15/0046 |
| EP | 2049857 | A | * | 12/1980 | ............... E04B 1/49 |
| | | | | | 1/49 |
| FR | 832233 | A | * | 9/1938 | ............... E04B 1/49 |
| FR | 1491173 | A | * | 8/1967 | ............... E04B 1/49 |
| GB | 355167 | A | * | 8/1931 | ............... E04B 1/49 |
| GB | 495606 | A | * | 11/1938 | ............... E04B 1/49 |
| WO | WO-2013188951 | A1 | * | 12/2013 | ............... B32B 3/30 |
| WO | WO-2018130524 | A1 | * | 7/2018 | ............ B29C 65/48 |

\* cited by examiner

INTEGRATED AMALGAMATION CARRIER

TECHNICAL FIELD

The present disclosure relates to an integrated amalgamation carrier and a manufacturing assembly including the same.

BACKGROUND

During manufacturing processes, parts sometimes need to be joined together. Therefore, joining devices are used to connect parts together. For instance, a bolt or a screw can be used to join multiple parts together.

SUMMARY

The present disclosure describes an integrated amalgamation carrier that can join parts. In the present disclosure, the term "amalgamation carrier" means a structure capable of carrying fasteners for joining two or more components together. The integrated amalgamation carrier includes an amalgamation carrier body elongated along a longitudinal axis or a transverse axis. In addition, the integrated amalgamation carrier includes a plurality of fasteners protruding from the amalgamation carrier body. The fasteners are integrated with the amalgamation body to form a one-piece structure. As a result, the joining features (i.e., the fasteners) are no longer part of the manufacturing equipment.

The present disclosure also relates to an amalgamating method that employs the integrated amalgamation carrier described above. This amalgamating method entails moving a first component and a second component relative to the integrated amalgamation carrier until the fasteners of the integrated amalgamation carrier pierce the first component and the second component.

The above features and advantages and other features and advantages of the present teachings are readily apparent from the following detailed description of the best modes for carrying out the teachings when taken in connection with the accompanying drawings.

DETAILED DESCRIPTION

Figure 1:
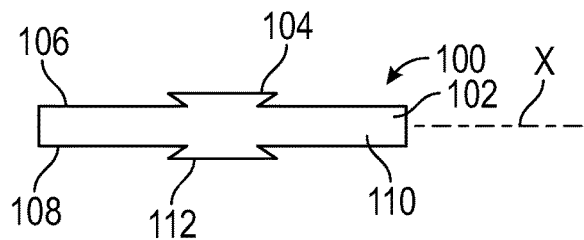
FIG. 1 is a schematic, fragmentary side view of an integrated amalgamation carrier including a carrier body and rivets coupled to the carrier body.
Figure 6:
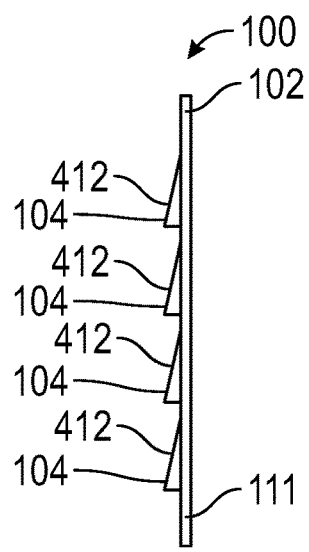
FIG. 6 is a schematic, fragmentary side view of the integrated amalgamation carrier shown in FIG. 5.

Referring to the drawings, wherein like reference numbers correspond to like or similar components throughout the several figures, FIGS. 1 and 6 schematically illustrate an integrated amalgamation carrier 100 for joining components 10 (e.g., a first component 12 and a second component 14). The integrated amalgamation carrier 100 includes a carrier body 102 and a plurality of fasteners 104 protruding from the carrier body 102. The fasteners 104 are integrated with the carrier body 102 to form a one-piece structure, thereby enhancing the structural integrity of a joint interface between the components 10. By integrating the fasteners 104 with the carrier body 102, the efficiency of a manufacturing process including joining components 10 (e.g., the first component 12 and the second component 14) can be maximized, because fasteners do not have to be individually attached to the components 10. Rather, multiple fasteners 104 can be simultaneously (or in close sequence) coupled to the components 10. The fasteners 104 of the integrated amalgamation carrier 100 may be have different configurations (e.g., self-piercing rivets, tack, prongs, barbs, etc.) and can also act as peel stoppers.

The integrated amalgamation carrier 100 can be added in between components or can be of a component (e.g., co-molded). Once the integrated amalgamation carrier 100 and components 10 (e.g., the first component 12 and the second component 14) are mated, a process described below can be employed to amalgamate components by crushing, folding, etc. the joining features. The integrated amalgamation carrier 100 and/or components 10 can be either processed cold or warm to enhance joint capacity. For instance, cold or warm fasteners 104 can be pressed into cold or heated components 10. The integrated amalgamation carrier 100 can be pressed into the components 10 such that the fasteners 104 partially or fully penetrate the components 10. The components 10 and the integrated amalgamation carrier 100 can be pressed together, sonically bonded, co-molded, etc. Because the fasteners 104 are integrated with the carrier body 102, the fasteners 104 can be processed simultaneously instead of individually. The assembly operations are simplified because joining fasteners no longer need to be fed into joining guns since now the joining fasteners are integrated into the incoming part.

The carrier body 102 may also be referred to as a base and has a planar shape (or substantially planar) shape in order to closely contact or abut the components 10. Thus, the carrier body 102 extends along a first longitudinal axis X. It is envisioned, however, that the carrier body 102 may have other suitable shapes. Regardless of its shape, the carrier body 102 may be wholly or partly made of a substantially rigid material, such as a rigid metallic material or a rigid non-metallic material, to allow the integrated amalgamation carrier 100 to at least partially support the components 10. The carrier body 102 may be wholly or partly made of the same as the components 10. Alternatively, the carrier body 102 may be wholly or partly made of different materials from the components 10. The carrier body 102 defines a first body surface 106 and a second body surface 108 opposite the first body surface 106.

The fastener 104 are directly coupled to the carrier body 102 and may be wholly or partly made substantially rigid material (e.g., metallic or non-metallic material) capable of piercing or semi-piercing the components 10. It is contemplated that the fasteners 104 may be rivets, tacks, prongs, spikes, barbs, among others.

In the embodiment depicted in FIG. 1, the carrier body 102 may be a strip 110, and the fasteners 104 may be rivets 112. As a non-limiting example, the rivet 112 may be a self-piercing rivet 112. The self-piercing rivet 112, under the press from the punch, pierces the first component 12 and forms a mechanical interlock with the second component 14. Pre-drilled holes are not necessary when using self-piercing rivets 112 to join the first component 12 to the second component 14. The self-piercing rivets 112 can be co-molded with the strip 110. During the joining process, the self-piercing rivets 112 are joined with the components 10.

Figure 2:
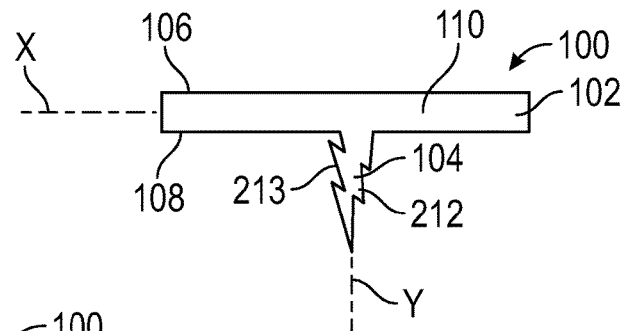
FIG. 2 is a schematic, fragmentary side view of an integrated amalgamation carrier including tacks.

In the embodiment depicted in FIG. 2, the carrier body 102 may be a strip 110, and the fasteners 104 are substantially sharp bodies 212 capable of piercing the components 10. The strip 110 may be flexible to facilitate the manufacturing process. As a non-limiting example, the fasteners 104 may be tacks 213. The tacks 213 (or any other suitable sharp bodies 212) directly protrude from either the first body surface 106 or the second body surface 108 of the carrier body 102. In this embodiment, the integrating sharp bodies 212, such as tacks 213, facilitate piercing of the components 10. Each sharp body 212 extends (and is elongated) along a second longitudinal axis Y, which is perpendicular to the first longitudinal axis X, in order to facilitate piercing the components 10 with the sharp bodies 212.

Figure 3:
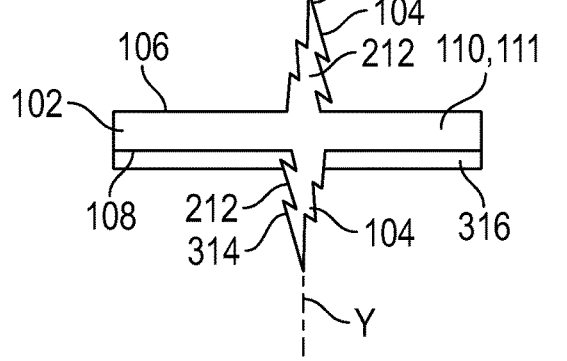
FIG. 3 is a schematic, fragmentary side view of an integrated amalgamation carrier including tacks on opposite sides of the carrier body.

In the embodiment depicted in FIG. 3, the carrier body 102 may be a strip 110 or a plate 111 (FIG. 5), and the integrated amalgamation carrier 100 includes fasteners 104 protruding from the carrier body 102 in opposite directions. As a non-limiting example, the fasteners 104 include a first fastener 312 and a second fastener 314. The first fastener 312 protrudes directly from the first body surface 106 away from the second body surface 108. The second fastener 314 protrudes directly from the second body surface 108 away from the first body surface 106. Accordingly, the first fastener 312 and the second fastener 314 protrude from the carrier body 102 in opposite directions, thereby enabling the integrated amalgamation carrier 100 to form a joint between the components 10. In the depicted embodiment, the first fastener 312 and the second fastener 314 are sharp bodies 212. However, it is envisioned that the first fastener 312 and the second fastener 314 may be other kinds of fasteners 104. Further, in the depicted embodiment, the first fastener 312 and the second fastener 314 extend (and are elongated) perpendicularly from the carrier body 102. For example, the first fastener 312 and the second fastener 314 each extend (and are elongated) in a second longitudinal axis Y, which is perpendicular to the first longitudinal axis X, in order to facilitate piercing the components 10 with the fasteners 104. The integrated amalgamation carrier 100 may additionally include one or more structural adhesive layers 316, such as an epoxy layer, for adhering the components 10 to the integrated amalgamation carrier 100. The structural adhesive layer 316 is wholly or partly made of a structural adhesive, such as an epoxy adhesive. Structural adhesives have a greater load bearing capabilities than conventional adhesive. As a non-limiting example, the adhesive load bearing of structural adhesive used for the structural adhesive layer 316 may range between the two thousand and six thousand pounds per square inch in order to ensure adhesion between the components 10 and the integrated amalgamation carrier 100. The structural adhesive layer 316 may be disposed on the fasteners 104 and/or the carrier body 102. For instance, the structural adhesive layer 316 may be disposed on (and in direct contact with) the first body surface 106 and/or the second body surface 108 of the carrier body 102. It is envisioned, that the structural adhesive layer 316 may be substituted with an isolation material. Alternatively, isolation material may be incorporated in addition to the structural adhesive layer 316.

Figure 4:
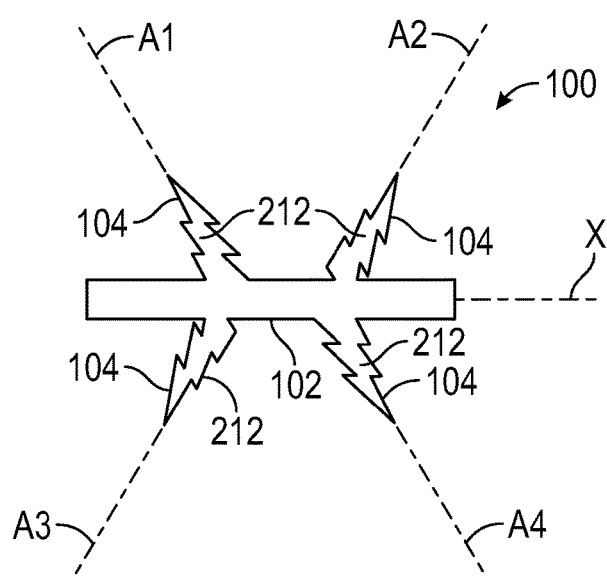
FIG. 4 is a schematic, fragmentary side view of an integrated amalgamation carrier including angled fasteners.

In the embodiment depicted in FIG. 4, the integrated amalgamation carrier 100 has fasteners 104 that are obliquely angled relative to the carrier body 102. As a non-limiting example, the fasteners 104 may be configured as sharp bodies 212 and each extends (and is elongated) along respective angled axes A1, A2, A3, A4. The angled axes A1, A2, A3, A4 are each obliquely angled relative to the first longitudinal axis X, thereby preventing slippage between components 10 joined by the integrated amalgamation carrier 100.

Figure 5:
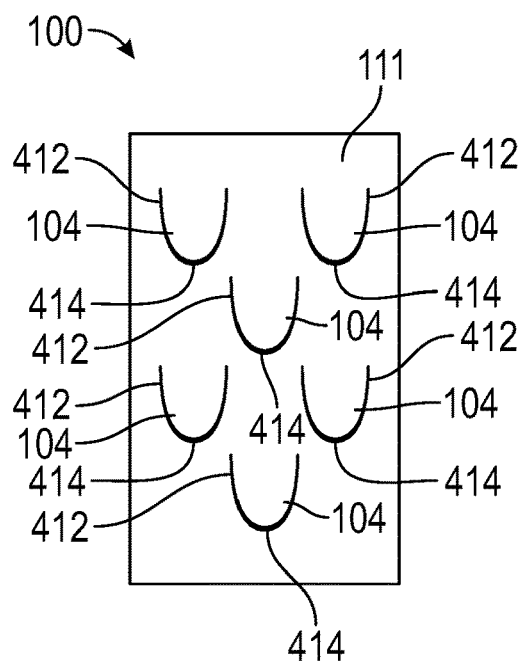
FIG. 5 is a schematic, fragmentary front view of an integrated amalgamation carrier including semi-penetrating fasteners.

With reference to FIGS. 5 and 6, the integrated amalgamation carrier 100 has fasteners 104 that have a semi-penetrating configuration. As used herein, the term "semi-penetrating configuration" means a shape and size that allows the fastener 104 to penetrate into but not entirely through the components 10 (shown in FIG. 7). In the depicted embodiment, the carrier body 102 is a plate 111, and the fasteners 104 are referred herein as the semi-penetrating fasteners 412. The semi-penetrating fasteners 412 have a substantially round and blunt periphery 414 as shown in FIG. 5, but protruding from the plate 111 in tapered manner as shown in FIG. 6. Accordingly, the semi-penetrating fasteners 412 can penetrate into but not entirely through the components 10 (shown in FIG. 7).

Figure 7:
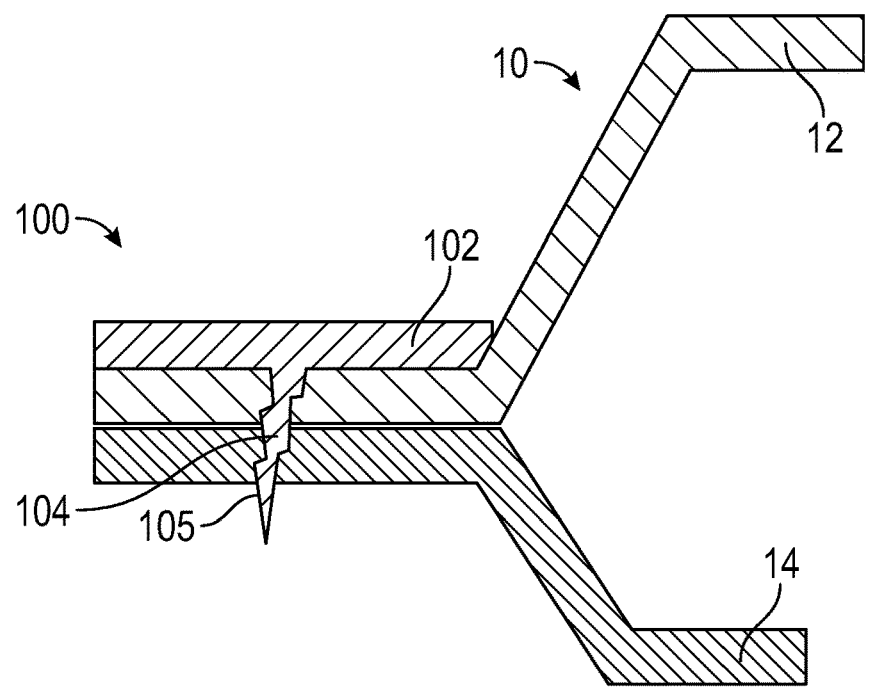
FIG. 7 is a schematic, sectional side view of the integrated amalgamation carrier shown in FIG. 2 being coupled to the first and second components.
Figure 8:
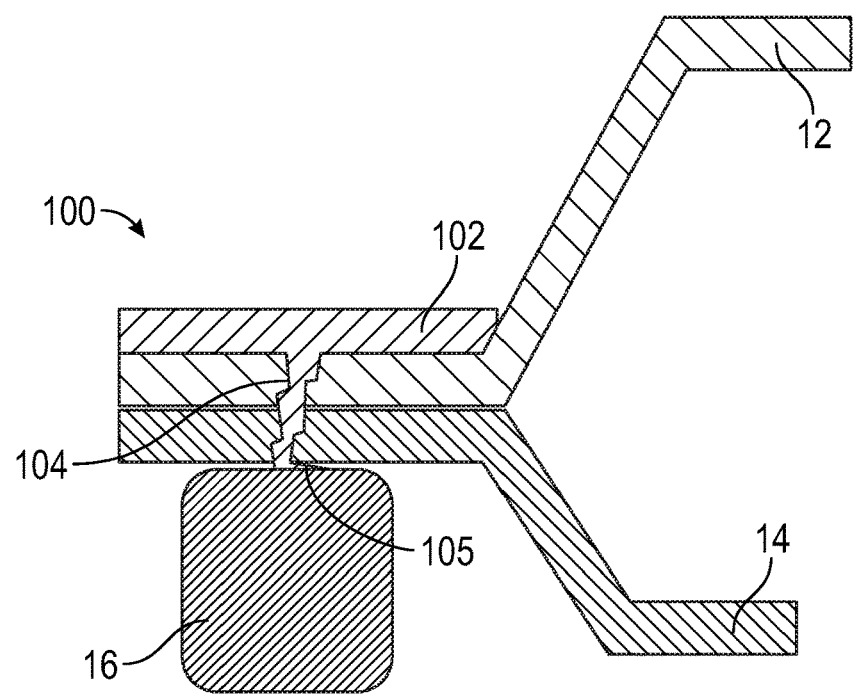
FIG. 8 is a schematic, sectional side view of the integrated amalgamation carrier shown in FIG. 2 coupled to the first and second components, depicting a roller bending the fastener.

With reference to FIGS. 7 and 8, the present disclosure also relates to an amalgamation method, which begins by providing the integrated amalgamation carrier 100 described in the present disclosure. Then, the first component 12 and the second component 14 are pierced with at least one of the fasteners 104 of the integrated amalgamation carrier 100 to join the first component 12 to the second component 14. At least one of the fasteners 104 (or all of the fasteners 104) can pierce both the first component 12 and the second component 14. As a consequence, the number of fasteners 104 in one integrated amalgamation carrier 100 may be minimized. The carrier body 102 can be advanced toward the components 10 until the carrier body 102 is in direct contact with the first component 12 or the second component 14 in order to enhance the structural integrity of the joint formed by the integrated amalgamation carrier 100. Each of the fasteners 104 can be advanced through the first component 12 and the second component 14 until a portion 105 of each fastener 104 is disposed outside the first component 12 and the second component 14. The integrated amalgamation carrier 100, the first component 12, and/or the second component 14 may be heated to facilitate piercing the first component 12 and/or the second component 14 with the fasteners 104. Optionally, as shown in FIG. 8, a roller 16 can be turned to bend the portion 105 of the fastener 104 that is disposed outside the first component 12 and the second component 14, thereby forming a mechanical lock.

Figure 9:
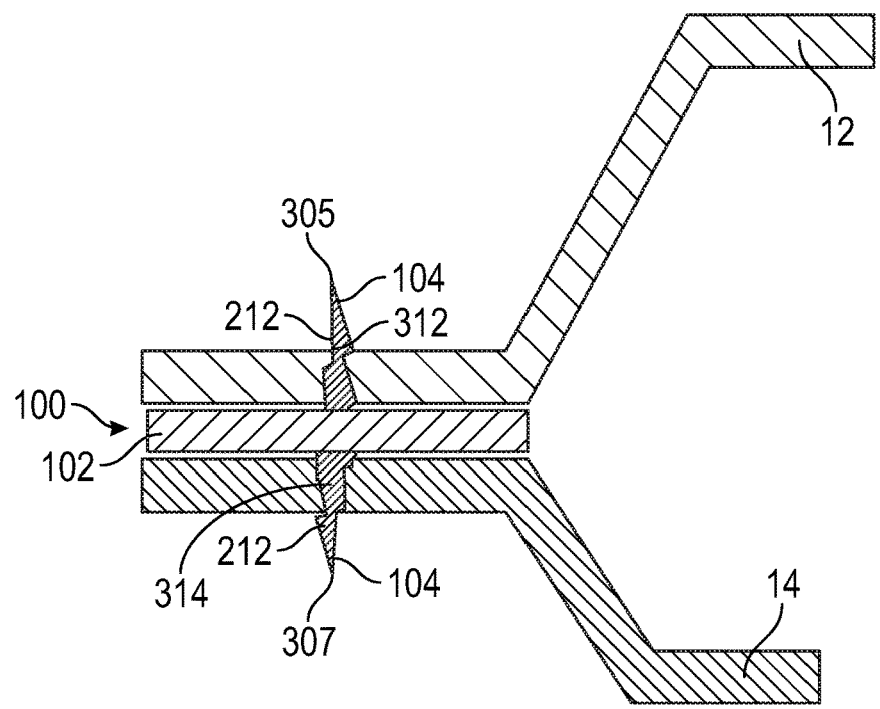
FIG. 9 is a schematic, sectional side view of the integrated amalgamation carrier shown in FIG. 3 being coupled to the first and second components.
Figure 10:
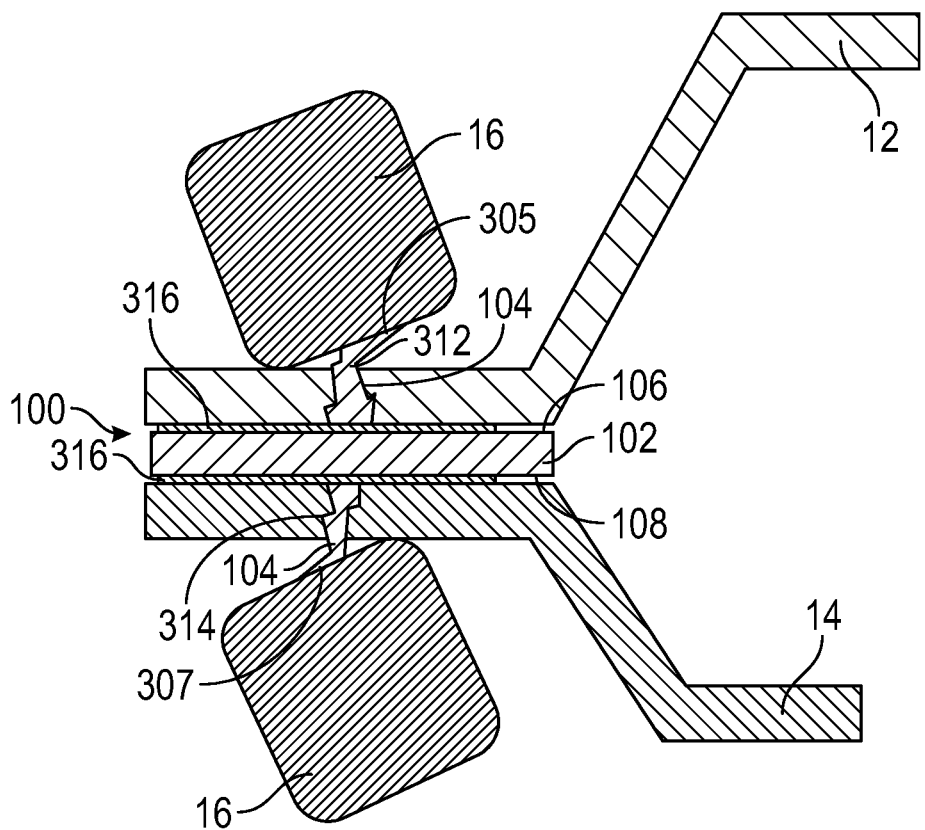
FIG. 10 is a schematic, sectional side view of the integrated amalgamation carrier shown in FIG. 3 coupled to the first and second components, depicting rollers bending the fasteners.

With reference to FIGS. 9 and 10, the integrated amalgamation carrier 100 is positioned between the first component 12 and the second component 14. Then, the first component 12 is pierced with the first fastener 312, and the second component 14 is pierced with the second fastener 314. The first fastener 312 can be advanced through the first component 12 until a portion 305 of the first fastener 312 is disposed outside the first component 12. The second fastener 314 is advanced through the second component 14 until a portion 307 of the second fastener 314 is disposed outside the second component 14. Optionally, rollers 16 can be turned to bend the portion 305 of the first fastener 312 that is disposed outside the first component 12 and the portion 307 of the second fastener 314 that is disposed outside the second component 14, thereby forming symmetrical or non-symmetrical mechanical locks. One or more structural adhesive layers 316 can be placed between the first component 12 and the first body surface 106 of the carrier body 102 to adhere the carrier body 102 to the first component 12. One or more structural adhesive layers 316 can be placed between the first component 12 and the second body surface 108 of the carrier body 102 to adhere the carrier body 102 to the second component 14.

Figure 11:
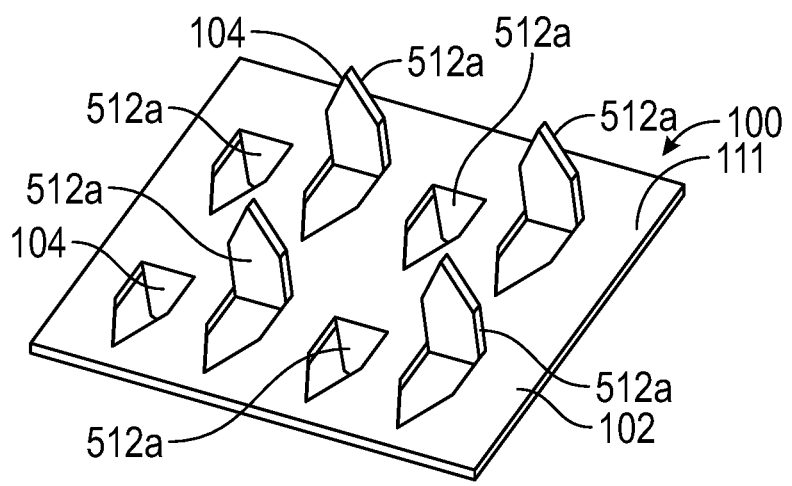
FIG. 11 is a schematic, perspective view of an integrated amalgamation carrier in accordance with an embodiment of the present disclosure.
Figure 12:
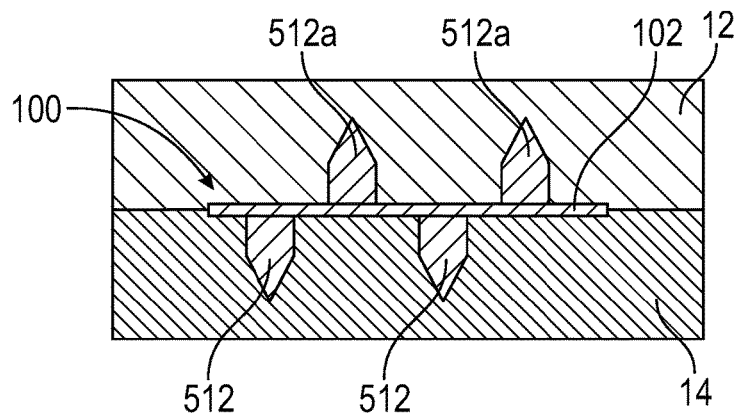
FIG. 12 is a schematic, sectional view of the integrated amalgamation carrier shown in FIG. 11, depicting spikes entirely disposed within the first and second components.

In the integrated amalgamation carrier 100 depicted in FIGS. 11 and 12, the carrier body 102 is a plate 111, and the fasteners 104 are spikes 512a protruding in opposite directions. The spikes 512a are configured to pierce the first component 12 and the second component 13. Specifically, as shown in FIG. 12, during the amalgamation method, some spikes 512a are advanced through the first component 12 until those spikes 512a are entirely disposed inside the first component 12, while other spikes 512a are advanced through the second component 14 until those spikes 512a are entirely disposed inside the second component 14. As a consequence, it is not necessary to bend the spikes 512a in this amalgamation method.

Figure 13:
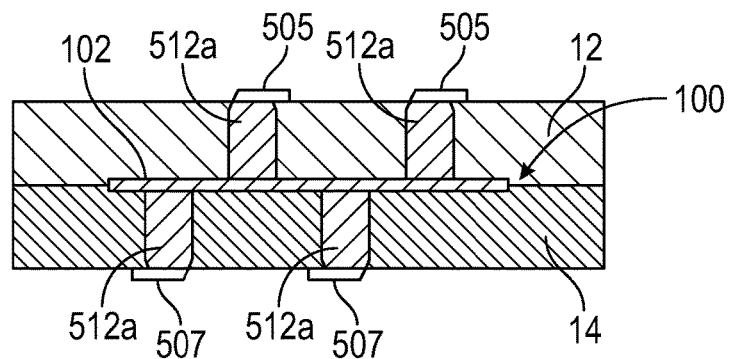
FIG. 13 is a schematic, sectional view of the integrated amalgamation carrier shown in FIG. 11, depicting spikes partly disposed outside the first and second components.

Alternatively, as shown in FIG. 13, some spikes 512a are advanced through the first component 12 until a portion 505 of those spikes 512a are disposed outside the first component 12, while other spikes 512a are advanced through the second component 14 until a portion 507 of those spikes 512a are disposed outside the second component 14. Then, the portions 505 and 507 of the spikes 512a are bent over the first component 12 and the second component 14, respectively, to form mechanical locks.

Figure 14:
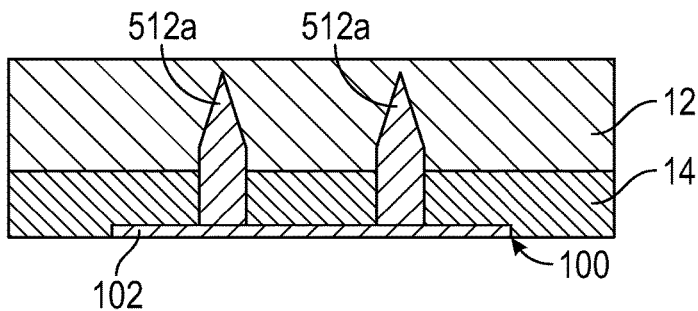
FIG. 14 is a schematic, sectional view of the integrated amalgamation with spikes protruding in one direction, wherein the spikes are entirely disposed inside the first and second components.
Figure 15:
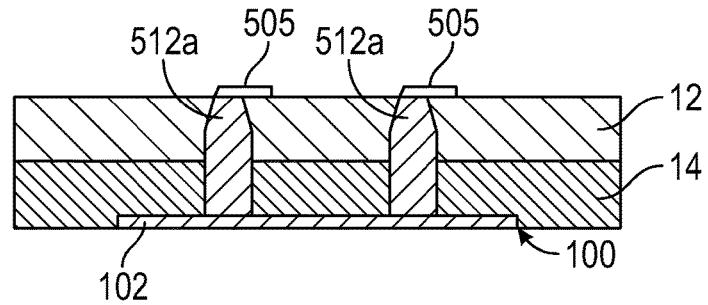
FIG. 15 is a schematic, sectional view of an integrated amalgamation carrier with spikes protruding in one direction, wherein the spikes are partly disposed outside the first and second components.

Alternatively, as shown in FIG. 14, the integrated amalgamation carrier 100 includes spikes 512a protruding only in one direction. Therefore, the spikes 512a are advanced through both the first component 12 and the second component 14. In other words, in this embodiment, the spikes 512a are inserted from one side and pierce both the first component 12 and the second component 14. As shown in FIG. 14, the spikes 512a can be disposed entirely inside the first component 12 and the second component 14. Alternatively, as shown in FIG. 15, during the amalgamation method, the spikes 512a are advanced through the first component 12 and the second component 14 until those spikes 512a exit the second component 14 and a portion 505 of each spike 512a is disposed outside the first component 12 and the second component 14. The portions 505 of the spikes 512a are then bent over the second component 14 to form mechanical locks. The spikes 512a can be tuned in for specific joining material need. For example, the height, thickness and width of the spikes 512a can be adjusted. The number, pattern, and angles of the spikes 512a can be scaled to meet joint requirements. The size of the amalgamation patch is also scalable (e.g., length, width) to meet the joint requirements.

Figure 16:
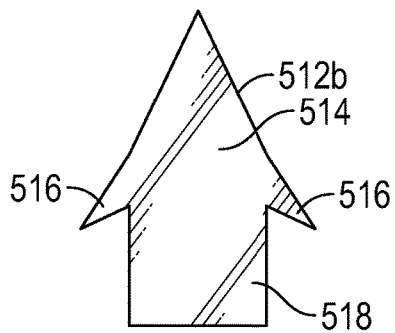
FIG. 16 is a schematic, front view of a spike of the integrated amalgamation carrier in accordance with an embodiment of the present disclosure.

With reference to FIG. 16, in other embodiments, the spikes 512b may include a spike base 518, a piercing body 514 coupled to the spike base 518, and barbs 516 extending from the piercing body 514. The barbs 516 may extend from opposite sides of the piercing body 514. The spike base 518 is configured to be directly coupled to the carrier body 102. The piercing body 514 may have a triangular shape to facilitate piercing through the first component 12 and/or the second component 14. The barbs 516 help retain the spikes 512b in the first component 12 and/or the second component 14.

Figure 17:
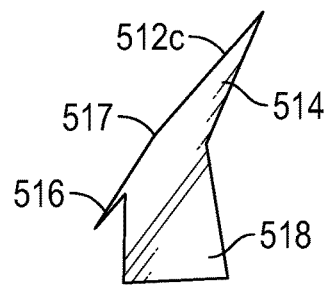
FIG. 17 is a schematic, side view of a spike of the integrated amalgamation carrier in accordance with an embodiment of the present disclosure.

With reference to FIG. 17, in other embodiments of the spike 512c, the barbs 516 and the piercing body 514 may be obliquely angled relative to the spike base 518 help retain the spikes 512b in the first component 12 and/or the second component 14. In the depicted embodiment, the barbs 516 extend from a frontal wall 517 of the piercing body 514.

Figure 18:
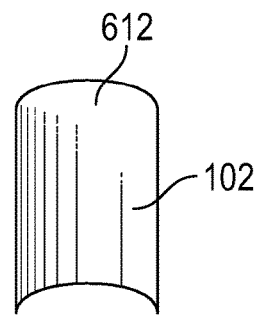
FIG. 18 is a schematic, front view of a spike of the integrated amalgamation carrier in accordance with an embodiment of the present disclosure.

With reference to FIG. 18, the fastener 104 may have a semi-penetrating configuration as discussed above. In this embodiment, the fastener 102 is a semi-penetrating body 612 having a semi-cylindrical shape to allow the fastener 104 to partly (but not entirely) penetrate the first component 12 and/or the second component 14. The semi-penetrating body 612 may have other slightly blunt shapes.

Figure 19:
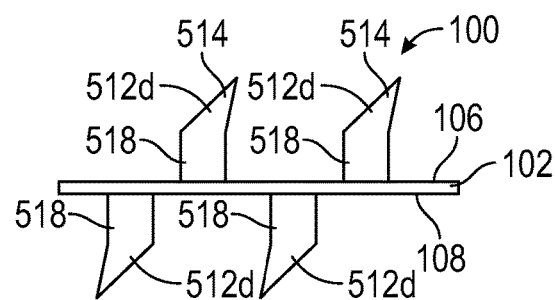
FIG. 19 is a schematic, side view of an integrated amalgamation carrier with spikes protruding from opposite sides of a carrier body in accordance with an embodiment of the present disclosure.
Figure 20:
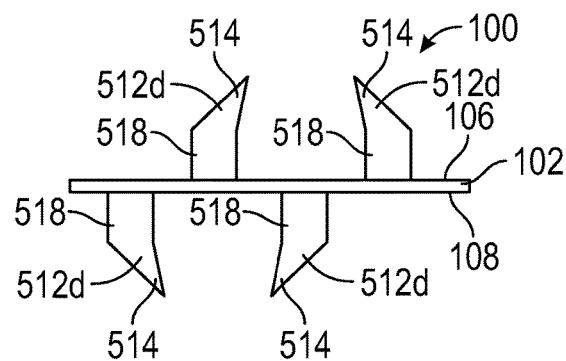
FIG. 20 is a schematic, side view of an integrated amalgamation carrier with spikes protruding from opposite sides of a carrier body in accordance with another embodiment of the present disclosure.

As shown in FIGS. 19 and 20, the spikes 512d have a spike base 518 and a piercing body 514 obliquely angled relative to the spike base 518, but the spike 512d does not include barbs 516. The spikes 512d may be arranged in an alternating pattern on the carrier body 102. In the embodiment shown in FIG. 19, the spikes 512d directly coupled to the first body surface 106 have a different orientation that the spikes 512d that are directly coupled to the second body surface 108. In the embodiment shown in FIG. 20, the spikes 512d that are directly coupled to the same surface (i.e., the first body surface 106 or the second body surface 108) have different orientations.

While the best modes for carrying out the teachings have been described in detail, those familiar with the art to which this disclosure relates will recognize various alternative designs and embodiments for practicing the teachings within the scope of the appended claims. The integrated amalgamation carrier illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings.

The invention claimed is:

1. An amalgamating method, comprising:
providing an integrated amalgamation carrier, wherein the integrated amalgamation carrier includes a carrier body and a plurality of fasteners protruding from the carrier body, wherein the plurality of fasteners are integrated with the carrier body to form a one-piece structure, the carrier body defines a first body surface and second body surface opposite the first body surface, the plurality of fasteners includes a first fastener protruding directly from the first body surface away from the second body surface, the plurality of fasteners includes a second fastener protruding directly from the second body surface away from the first body surface, the first fastener and the second fastener protrude from the carrier body in opposite directions, the carrier body is a plate, and each of the first fastener and the second fastener is a tack, the carrier body is elongated along a first longitudinal axis, each of the first fastener and the second fastener is elongated along a second longitudinal axis, the second longitudinal axis is perpendicular to the first longitudinal axis, and the first fastener and the second fastener are aligned with each other such that such that the second longitudinal axis intersects the first fastener and the second fastener; and
positioning the carrier body between a first component and a second component, wherein the carrier body is wholly made of a metallic material to allow the integrated amalgamation carrier to at least partially support the first component and the second component;
placing a first structural adhesive layer between the first component and the carrier body to adhere the carrier body to the first component;
placing a second structural adhesive layer between the second component and the carrier body to adhere the carrier body to the second component, wherein each of the first structural adhesive layer and the second structural adhesive layer, wherein each of the first structural adhesive layer and the second structural adhesive layer includes a structural adhesive, and an adhesive load bearing of the structural adhesive is between 2,000 and 6,000 pounds per square inch in order to ensure adhesion between the integrated amalgamation carrier and the first component and the second component;
piercing the first component and the second component with the plurality of fasteners of the integrated amalgamation carrier to join the first component and the second component, wherein each of the first fastener and the second fastener is a sharp body configured to pierce the first component and the second component, each of the first fastener and the second fastener is wholly made of a non-metallic material capable of piercing the first component and the second component;
advancing the first fastener through the first component until a portion of the first component is disposed outside first component;
advancing the second fastener through the second component until a portion of the second fastener is disposed outside the second component;
turning a first roller to bend the portion of the first fastener that is disposed outside the first component; and
turning a second roller to bend the portion of the second fastener that is disposed outside the second component.

2. The amalgamating method of claim 1, wherein each of the first fastener and the second fastener has a serrated configuration.

* * * * *